(No Model.)
S. A. HEWITT.
Rollers for Welding Plane Iron Stock.
No. 233,754. Patented Oct. 26, 1880.
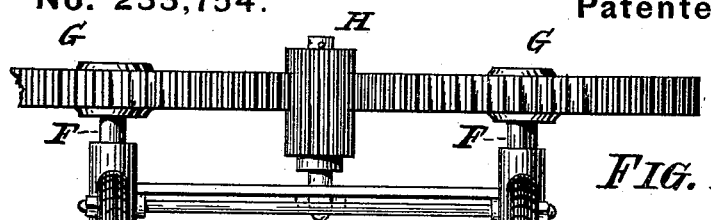
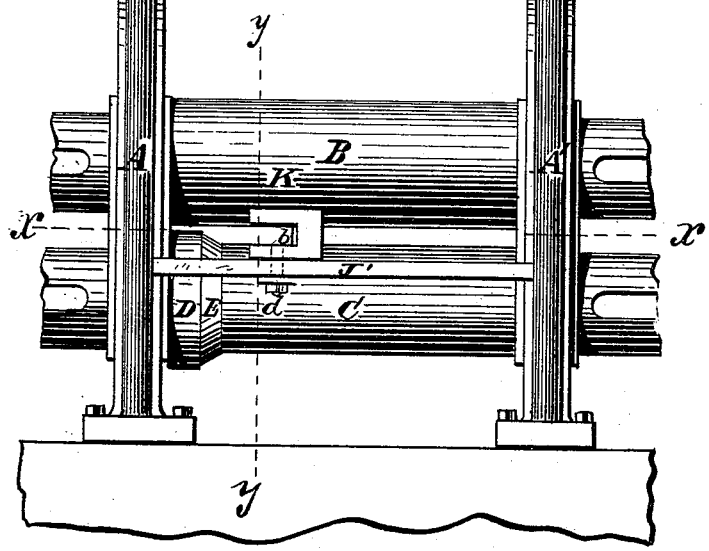
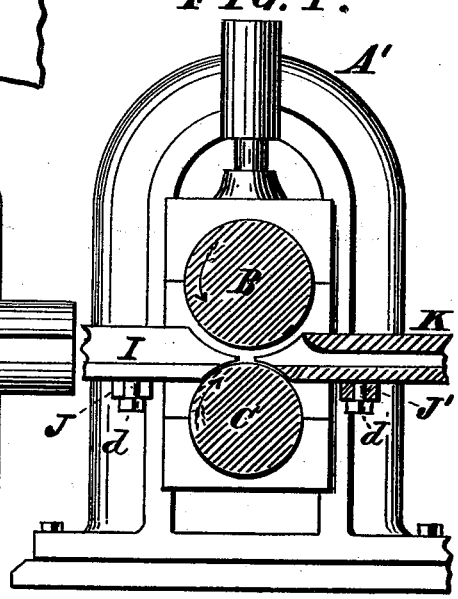
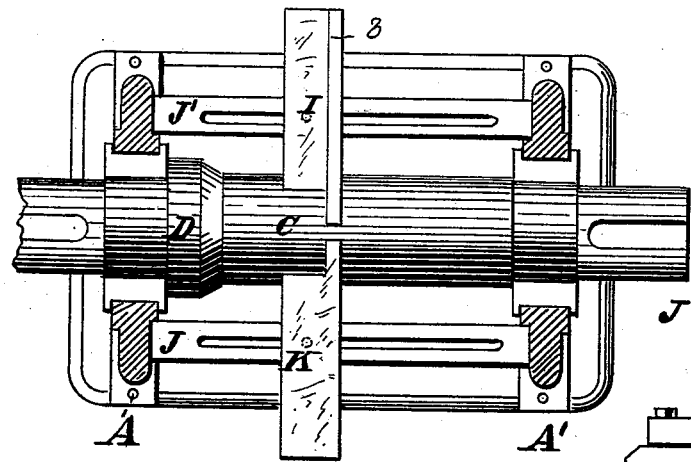
Witnesses:
Michael J. Stark,
George J. Straub.
Inventor:
Samuel A. Hewitt,
by Michael J. Stark,
Attorney.
N. PETERS, PHOTO-LITHOGRAPHER, WASHINGTON, D.C.

UNITED STATES PATENT OFFICE.

SAMUEL A. HEWITT, OF BUFFALO, NEW YORK, ASSIGNOR TO LEONARD WHITE, OF SAME PLACE.

ROLLERS FOR WELDING PLANE-IRON STOCK.

SPECIFICATION forming part of Letters Patent No. 233,754, dated October 26, 1880.

Application filed July 15, 1880. (No model.)

*To all whom it may concern:*

Be it known that I, SAMUEL A. HEWITT, of Buffalo, in the county of Erie and State of New York, have invented certain new and useful Improvements on Rollers for Welding Plane-Iron Stock; and I do hereby declare that the following description of my said invention, taken in connection with the accompanying sheet of drawings, forms a full, clear, and exact specification, which will enable others skilled in the art to which it appertains to make and use the same.

This invention has general reference to rolls for welding and rolling plane-iron stock, such as planer-knives, paper-cutters, and similar edge-tools; and it consists, essentially, in the peculiar combination of parts and details of construction, as hereinafter first fully set forth and described, and then pointed out in the claims.

In the drawings already mentioned, which serve to illustrate my said invention more fully, Figure 1 is a side elevation of my improved rolls. Fig. 2 is a sectional plan in line $xx$ of Fig. 1. Fig. 3 is an elevation of a fragment of the rolls and adjustable gages. Fig. 4 is a sectional elevation in line $yy$ of Fig. 1.

Like parts are designated by corresponding letters of reference in all the figures.

The object of my present invention is the production of a pair of rolls, by means of which I am enabled to weld the steel to the iron of plane-iron stock, such as planer-knives, molding-cutters, paper-cutters, shear-blades, and other edge-tools having a comparatively long but narrow body, the steel being on one of the longitudinal edges of said body.

Heretofore this stock has been rolled and welded between a pair of rolls having grooves corresponding to the width and thickness of the stock to be produced. This method of welding requires rolls of which one is provided with grooves varying in width with that of the plane-iron stock, a groove of, say, three inches being capable of producing stock of three inches in width and nothing else. This method, furthermore, requires a number of rolls, a single roll not being capable of receiving as many grooves as there are sizes of plane-iron stock, and it necessitates, therefore, frequent changes of rolls to fill orders for plane-iron stock of various dimensions. It is perfectly obvious that this changing of rolls, which may have to be performed many times during a working day, absorbs considerable time, so much so that the changes often occupy the greater part of a working day. To overcome this latter objection, and to enable me at the same time to produce plane-iron stock of any width without removing a single roll, and without spending more than a few moments of time for each change, I construct my rolls substantially as follows:

First, I provide a suitable housing, A A', for a pair of rolls, B C, and mount said rolls in bearings or journals in the usual manner. Of these rolls, B is a plain cylindrical one, and the other similarly constructed, but provided on one end with a circumferential rim or flange, D, and a beveled part, E, said beveled part forming an intermediary between the cylindrical portion of said roll and the rim D, already referred to. One pair of the journals for the rolls—those of the lower roll, C—are fixed in the housing A A'. The others, however, are rendered vertically adjustable by means of screws F, operated by spur-wheels G engaging an intermediate pinion, H, in such manner that both screws will revolve when either spur-wheel is operated. Between the housings A A' are fastened two slotted bars or transverse pieces, J J', upon which are movably secured an L-shaped piece, I, and a U-shaped piece, K, said pieces I K serving as a gage and backing in a manner hereinafter to be referred to.

In operation the preliminaries for welding the steel to the iron are the same as those practiced in all establishments producing the class of work referred to, and need not here be described; but previous to passing the stock between the rolls to weld the steel and to form the bevel for the cutting-edge I adjust the gages I and K in such manner that the space between the edge $a$ of the rim D (see Fig. 3) and the vertical member $b$ of said gages I K corresponds to the width of the plane-iron stock to be produced, adjustment being made by unscrewing the bolts $d$ on said gages and sliding the latter upon the slotted transverse pieces J J' until the proper distance is attained. If, now, the stock, heated to the welding-point, is passed through between the rolls B C, a perfect union of the iron and steel is attained, and at the same time the bevel for the cutting-edge of the plane-iron stock produced at one passage of said stock through the rolls. In its passage through between the rolls the tendency of the stock is to move away from the beveled part E of the roll C. This tendency is counteracted by the gages or backing-pieces I K, so that the stock leaves the roll in almost a perfectly-straight condition.

It will now be readily observed that by the means described I can produce plane-iron stock of any width up to the length of the roll C without making any other changes on the machine but to move the gages and backing-pieces I K, and that this latter operation may be performed in a few moments of time.

Of the gages or backing-pieces I K the former is L-shaped, so as to enable the plane-iron stock to be readily introduced between the rolls. The latter, however, is U-shaped, which I have so designed for the purpose of stripping the stock from the rolls in case it should have a tendency of sticking to the same, and at the same time to prevent the stock from curling up. This latter feature is a very essential one, since it saves considerable labor in straightening the stock, which, no matter how performed, is objectionable, owing to the liability of the steel getting loose from the iron.

In the drawings I have shown the vertical members b of the backing-pieces in line. This is practically, however, not the case; but the backing I is somewhat in advance of the backing K, because the stock in its passage through the rolls widens, and hence the backing K must be set back as much as the stock increases in width, the distance varying according to the thickness of the stock previous to its being rolled.

Having thus fully described my invention, I claim as new and desire to secure to me by Letters Patent of the United States—

1. In machines for welding and shaping plane-iron stock, a pair of rolls, one of which is a plain cylindrical one and the other a similar one having on one end a circumferential flange, D, and a bevel, E, said rolls being mounted within a suitable housing, A A', having slotted cross-pieces J J', an L-shaped backing-piece, I, and a U-shaped backing piece, K, the whole being constructed for operation substantially in the manner as and for the object specified.

2. In welding-rolls for plane-iron stock, a pair of rolls, B C, the former being a plain cylindrical roll and the latter a similar one having on one end a circumferential projecting rim, D, and a bevel, E, in combination with adjustable backing-pieces I K, at right angles to the axis of said rolls, whereby plane-iron stock of any width may be rolled between said rolls and the cutting-edge bevel formed thereon, substantially in the manner as and for the object stated.

3. In welding-rolls for plane-iron stock, the adjustable L-shaped backing-piece I and adjustable U-shaped backing-piece K, as and for the purpose indicated.

In testimony that I claim the foregoing as my invention I have hereto set my hand in the presence of two subscribing witnesses.

SAMUEL A. HEWITT.

Attest:
MICHAEL J. STARK,
GEORGE J. STRAUB.